Patented Nov. 22, 1949

2,489,170

UNITED STATES PATENT OFFICE 2,489,170

ADHESIVE COMPOSITION FOR PAPER

Leonard C. Wooster, Clayton, Mo., and Earl E. Gardiner, Mission, Tex., assignors, by mesne assignments, to Stancal Asphalt & Bitumuls Company, San Francisco, Calif., a corporation of Delaware No Drawing. Application March 7, 1944, Serial No. 525,474

16 Claims. (Cl. 154—45.9)

This application relates to an improvement in the art of adhesives, more particularly, to an improved adhesive containing starch or other suitable glue and a resin of the type which sets thermally or by other means after the adhesive has been applied, said improved adhesive being particularly useful for pasting together plies of paper to form multiply paper board.

In the art of making paper board, with which this invention is particularly concerned, it is the practice to paste together two or more plies of paper by means of an adhesive to form a multiply product. The adhesive used is an aqueous dispersion of an organic or inorganic glue. An example of an inorganic glue is sodium silicate. Organic glues may be of vegetable origin (such as starch and albumen glue) or of animal origin (such as gelatin, fish glue, bone glue, hide glue and casein).

Starch adhesives may be taken as illustrative of adhesives made from organic glues. Starch adhesive is prepared by cooking together, usually at a temperature of about 180°–190° F., a mixture of water and starch to produce a paste. The starch used may be raw starch but it is usually a dextrinized starch, having been dextrinized or partly hydrolyzed by an acid (to produce "acid" starch) or an alkali (to produce "alkaline" starch). The proportions of starch and water may vary widely according to the processes involved, the pasting machinery used and the stock which is pasted.

Starch adhesives are notably lacking in waterproofness, as are adhesives made from other organic glues and from inorganic glues. Thus multiply paper board pasted with starch-water adhesive, when immersed in water, delaminates in a short time. This defect has been remedied to a large exent, sufficiently to cause multiply paper board pasted with the starch adhesive to pass specifications calling for 24-hour immersion in water, by incorporating in the starch paste a small amount, preferably about 10% by weight based on dry starch, of a water-soluble thermosetting resin. An example of a suitable resin is a water-soluble urea-formaldehyde resin. A catalyst, such as ammonium chloride, is also added to cause setting of the resin.

The addition of a water-soluble thermosetting resin (or a resin which sets through catalytic or other action) to starch or other adhesives to impart greater resistance to attack by water is not without its disadvantages. Such resins are costly, much more so than starch and most other glues used. Urea-formaldehyde and other thermosetting resins also impart a brittleness to the adhesive, such that when a multiply paper board pasted with an adhesive containing the resin is bent while immersed in water or before immersion in water, the adhesive bond is cracked and delamination results. Also, urea-formaldehyde resins when used in adhesives gradually give off formaldehyde, which is corrosive, and a paste containing such resins, while held in storage before use, is more likely than the same paste without the resin to set to a solid rubbery mass which is not only useless but involves expense in removing it from tanks and pipes.

It is an object achieved by the present invention to improve adhesives.

It is a further object achieved by the present invention to improve adhesives made of an organic glue and a water-soluble resin of the type that sets thermally, through the agency of a catalyst or otherwise after the adhesive has been applied.

It is a particular object achieved by the present invention to improve or to reduce the cost without substantially impairing the quality of starch adhesives containing a water-soluble thermosetting resin.

It is a further particular object achieved by the present invention to extend and thereby reduce the cost of starch-urea-formaldehyde resin adhesives without proportionately impairing the quality of said adhesives.

These and other objects of the invention will be apparent from the description and the appended claims.

We have discovered that water-soluble thermosetting resins and other water-soluble resins which set through other agencies, such as catalysts, in their various applications as adhesives and binders, can be extended and even improved by admixture of a bitumen, such as asphalt or coal tar, but preferably asphalt.

In particular we have discovered that starch-urea-formaldehyde resin adhesives are greatly improved and are cheapened by the presence of a bituminous emulsion, especially an asphalt emulsion.

The preferred embodiment of the present invention comprises an adhesive made of aqueous starch paste, a water-soluble urea-formaldehyde resin (with the catalyst for setting) and a stable aqueous asphalt emulsion. In other embodiments of the invention, other glues such as those herein above mentioned may replace the starch; other resins such as water-soluble phenol-formaldehyde, melamine, urea-furfural and furfuryl alcohol resins may replace the urea-formaldehyde resin; and coal tar, pitch and other bitumens may replace the asphalt.

To illustrate more fully the practice and advantages of the invention, the preferred embodiment (starch-water-soluble urea-formaldehyde resin-asphalt adhesive) is discussed in detail below.

In selecting the starch for making the starch paste and in making the paste, the ordinary skill of the art will largely govern, but in view of the addition of resin to the paste it is preferable to use an alkaline starch with a resin (such as a phenol-formaldehyde resin) whose setting is catalyzed by an alkali and to use an acid starch with a resin (such as a urea-formaldehyde resin) whose setting is catalyzed by an acid.

The urea-formaldehyde resin used is water-soluble in the sense of being sufficiently soluble in the final paste, containing starch, water and asphalt, to provide enough dissolved resin to perform the intended function of the resin in the cured adhesive bond. Thus in a typical example where a paste is made consisting of about 17 parts starch, 22 parts asphalt, 10% by weight of resin based on dry starch and 60 parts water, all parts by weight, it is sufficient that the resin be soluble to the extent of about 3% by weight in water. Higher solubilities are, of course, preferred. As is well known in the art, in the manufacture of many resins, such as urea-formaldehyde and phenol-formaldehyde resins, the water-solubility is initially high but as polymerization or resinification increases and the molecular weight increases, the water-solubility decreases and the resin eventually becomes completely insoluble in water and other solvents. It is apparent, therefore, that "water-soluble" is a broad, flexible term within the means of this invention, and the best criterion of sufficient water solubility for purposes of the invention is, that the resin should dissolve sufficiently in the aqueous starch-resin-asphalt adhesive at some stage in its manufacture to provide the desired property, such as passing the 24-hour delamination test described hereinbelow. Urea-formaldehyde resins available today are of the thermosetting type, but resins which set through the agency of a catalyst or any other means which is operative under the conditions of curing of the adhesive may be used.

The asphalt emulsion used in making the starch-urea-formaldehyde resin-asphalt adhesive is preferably a stable asphalt emulsion of the oil-in-water type, being sufficiently stable to pass the ASTM D397-39 demulsification test (not more than 30% demulsification by 50 ml. 0.1 N CaCl₂), also referred to as the Myers test. Most advantageously the asphalt emulsion is not more than 2% demulsified by the said Myers test. As stabilizing agents the proteins are preferred, e. g., casein, blood, soya bean meal, peanut meal and linseed meal. But soaps, the sodium salt of the alcohol-soluble, gasoline-insoluble pine wood resins described in Hall Patent 2,193,026, a caustic alkali solution of a purified lignin product prepared by precipitating spent soda black liquor with carbon dioxide, said product being insoluble in water, dilute mineral acids and nonpolar organic solvents and soluble in dilute alkalies and most polar organic solvents, as described by Plunguian in Industrial & Engineering Chemistry, vol. 32, pages 1399–1400, clay, waste sulfite liquor, etc., may be used instead of proteins. Appropriate emulsification procedures using the above types of emulsifying and/or stabilizing agents may be taken from the patent and general literature; e. g., Watts U. S. Patent 2,040,115 (casein), McKesson 2,074,731 (blood), McKesson 2,170,152 (casein), Cole et al. 2,336,468 (soyabean meal), Buckley 2,256,866, Kirschbraun 1,417,835 (clay) and Watts 2,332,542 (waste sulfite liquor). Softer asphalts are preferred to the hard asphalts, asphalt of 250 to 50 penetration by ASTM D5-25 method being preferred. The preferred emulsions also have 55 to 68% residue by the ASTM D244-42 method; pH of 7 to 9; asphalt particles of uniformly small size, most advantageously 0.5 to 10 microns diameter; and a viscosity about that of the starch paste to which the emulsion is added. Ordinarily emulsions made or stabilized with an alkaline material such as a soap, the above-mentioned pine wood resin salts, or a protein are strongly alkaline when made, having pH of about 11 or more. This is especially true of those emulsions, of which there are many, which contain excess caustic alkali or its equivalent. It is preferred, in the practice of the present invention and more particularly where a resin such as urea-formaldehyde is used which is catalyzed by an acidic substance, to neutralize or partly neutralize the emulsion, a final pH of 7 to 9 being preferred, as stated. The pH may even be carried, where acid resins are used, to the acid side, but where weakly alkaline emulsions are compatible with the resin used they are much preferred. The pH adjustment may be accomplished with boric, phosphoric or other acids.

In making the starch-resin-asphalt paste it is preferred to make the paste first in the ordinary manner by cooking starch with water, add the cold, stable asphalt emulsion to the hot starch paste thereby cooling the paste, add the resin to the starch paste-asphalt emulsion mixture and, finally, add the setting catalyst. This procedure may be varied. Thus, instead of using a preformed asphalt emulsion, hot, molten asphalt may be emulsified in the hot starch paste, since starch is itself an emulsifying agent. The mixture is then cooled and the resin and catalyst added to it. Or the procedure may even be adapted to the use of a quick-setting emulsion of the types described in Montgomery, U. S. Patent 1,643,675 and Braun 1,737,491. Thus a cold mixture of starch and water is made, to the mixture is added the quick-setting emulsion and the mixture is then cooked and cooled and the resin and catalyst are then added to the cold mixture.

A typical formula for a preferred adhesive of the invention is as follows:

| | Parts by weight |
|---|---|
| Acid dextrin starch | 17 |
| Water | 45 |
| A water-soluble urea-formaldehyde resin | 1.7 |
| Ammonium chloride | 0.2 |
| Asphalt emulsion | 36.1 |
| Total | 100.0 |

The asphalt emulsion may be a 60% residue asphalt emulsion stabilized with 1% by weight based on finished emulsion of sodium caseinate.

Proportions of the various ingredients of the starch-resin-asphalt adhesives are difficult to give except with reference to a particular use. Thus for pasting together paper plies in the manufacture of solid fiber board, 1 part of asphalt emulsion and 2 parts of starch paste may be used or the ratio may be 1 part of each, all parts being by weight. In such applications, it is not desirable to use more than 4 parts by weight of asphalt per part by weight of starch, dry basis, and a weight ratio of asphalt to starch not exceeding 2.5 to 1 is generally preferred because higher ratios may render the cured adhesive thermoplastic. In making corrugated paper board, 10 to 20 parts by weight of asphalt emulsion and 90 to 80 parts by weight of starch paste are preferred. For briquetting coal dust and other mineral particles, the proportions may be reversed, using 90 parts by weight of asphalt emulsion and 10 parts by weight of starch paste. Thus, depending upon the use to which the adhesive is put, the weight ratio of asphalt emulsion to starch paste may vary from about 1:10 to 10:1.

As stated, in the use of starch-urea-formaldehyde resin-asphalt adhesive for pasting together the plies of paper board, about 10% by weight of resin based on dry starch is preferred, but percentages may vary even in this particular use. And since it is one of the principal objects of the invention to extend the costly resin component of the adhesive—to get by with as little as possible consistent with high water resistance, high resistance to delamination, etc.—it is apparent that the proportion of resin used will depend upon a number of factors, such as the degree of water-resistance required, the cost of other components of the adhesive, and the extent to which the resin may be extended before the cured adhesive becomes thermoplastic or loses the characteristics imparted by the resin. It is believed that urea-formaldehyde, when it has set in an adhesive, behaves as the continuous phase, forming a kind of honeycomb structure which is filled in by the starch (which serves to give the adhesive its tack or stickiness) and by the asphalt (which serves as a plasticizer). Hence when the resin has been so extended that it cannot form the continuous phase, honeycomb-like structure, too much asphalt has been used.

Improvements obtainable with the adhesives of the invention are illustrated by the table below:

Adhesives Nos. 1, 2, 3 and 4 indicated in the table above were prepared as follows: 100 parts by weight of an acid dextrinized starch were cooked with 208 parts by weight of water at 180° F. to form a starch paste. This paste was cooled to 150° F. and 7 parts by weight of water-soluble urea-formaldehyde resin were added, the mixture was cooled to 120° F. and 0.84 part by weight of ammonium chloride was added. This constituted adhesive No. 1. Adhesive No. 2 was prepared by adding 40 parts by volume (36 parts by weight) of asphalt emulsion A to 60 parts by volume (64 parts by weight) of adehsive No. 1. Adhesive Nos. 3 and 4 were made similarly, substituting emulsions B and C, respectively, for emulsion A.

Emulsions A, B and C were as follows:

Emulsion A was a 68% residue emulsion of $85/100$ penetration Mid-Continent asphalt in water, emulsified and stabilized by a small amount each of the sodium salt of the above-mentioned pine wood resin and dextrinized starch. It passed the cement mixing test of ASTM D244-42 and was less than 2% demulsified by the Myers demulsibility test. pH of the emulsion was adjusted to 7-8.

Emulsion B was a 66% residue emulsion in water of the same asphalt as used in emulsion A, emulsified and stabilized, however, by slightly larger amount of potassium salt of the above-mentioned pine wood resin, containing no starch and containing a small amount of bentonite, sufficient to prevent upward or downward settlement of the asphalt phase. Emulsion B also passed the cement mixing test and was less than 2% demulsified by the Myers test.

Emulsion C was a 57% residue emulsion of an asphalt which was first emulsified by the process of Montgomery, U. S. Patent 1,643,675, in dilute aqueous caustic soda solution and was then stabilized by means of sodium caseinate. Emulsion C also passed the cement mixing test and was less than 2% demulsified by the Myers test.

Three and four ply paper boards were made, using adhesives Nos. 1, 2, 3 and 4 to paste the plies together, as shown in the table above. All conditions were kept the same except for variation of the number of plies and variation of the adhesive, as shown in the table. The delamination, absorption and glue line penetration indicated in the table were determined as follows:

The board under test is immersed in water at 70-80° F. for a given time. It is then removed and surface moisture is removed with a blotter.

*Comparison of starch-resin adhesives with starch-resin-bituminous emulsion adhesives*

| Adhesive No. | Components of Adhesive | No. of Plies | pH of Adhesive | Estimated Per Cent Delamination | | Per Cent Absorption | | Glue Line Penetration, Inches | | | |
|---|---|---|---|---|---|---|---|---|---|---|---|
| | | | | | | | | 6 Hrs. | | 24 Hrs. | |
| | | | | 6 Hrs. | 24 Hrs. | 6 Hrs. | 24 Hrs. | Ave. | Max. | Ave. | Max. |
| 1 | Starch Paste+water-soluble urea-formaldehyde resin | 3 | 4.1 | 0 | 0 | 138 | 152 | 0 | 0 | 0 | 0 |
| 1 | ...do... | 4 | 4.1 | 10 | 10 | 129 | 153 | ¼ | ½ | ¼ | 1 |
| 2 | Starch Paste+water-soluble urea-formaldehyde resin+Asphalt Emuls. A | 3 | 5.9 | 2 | 2 | 138 | 152 | 1/16 | ¼ | 1/16 | ¼ |
| 2 | ...do... | 4 | 5.9 | 0 | 0 | 131 | 147 | 0 | 0 | 0 | 0 |
| 3 | Starch Paste+water-soluble urea-formaldehyde resin+Asphalt Emuls. B | 3 | 6.9 | 5 | 10 | 134 | 148 | ⅛ | ½ | ⅛ | 1¼ |
| 3 | ...do... | 4 | 6.9 | 0 | 0 | 129 | 139 | 0 | 0 | 0 | 0 |
| 4 | Starch Paste+water-soluble urea-formaldehyde resin+Asphalt Emuls. C | 3 | 6.3 | 0 | 0 | 135 | 147 | 0 | 0 | 0 | 0 |
| 4 | ...do... | 4 | 6.3 | 0 | 0 | 129 | 139 | 0 | 0 | 0 | 0 |

The board is weighed before and after the test. The percentage absorption is given by the formula $$\text{Percent absorption} = \frac{\text{Damp weight}}{\text{Dry weight}} \times 100$$

The damp board is then subjected to the delamination test, in which the board is bent at all its four edges and the glue lines are pulled apart by hand as much as possible. Percentage delamination is the percentage of the total glue line area thus pulled apart. Glue line penetration is determined by observing the penetration of the glue line by water. The maximum penetration is the greatest penetration on any of the four sides while the average penetration is the average of all four sides.

As appears from the table, the adhesives containing asphalt emulsion, though containing much less resin than adhesive No. 1, were at least as effective as adhesive No. 1, containing a much higher proportion of resin.

Since asphalt is a very cheap material, cheaper than urea-formaldehyde resin for example, it is clearly a great advantage to be able to extend an adhesive containing an expensive resin by diluting it with asphalt emulsion. And surprisingly, this "extension" of the resin is obtainable without a reduction of quality of the adhesive. Even more surprisingly, the adhesive is improved in several important respects. Thus in practice it has been found that 85 parts of starch-urea-formaldehyde resin-asphalt emulsion adhesive will go as far as 100 parts of the starch-resin adhesive; the adhesive containing asphalt emulsion is less "tricky" in that it handles more easily and is not as liable to set to a rubbery mass as the starch-resin adhesive; the asphalt also plasticizes the adhesive rendering the adhesive bond more resistant to bending; the asphalt reduces corrosiveness of adhesives containing urea-formaldehyde resin; paper bonded with starch-resin adhesives containing asphalt also has greater resistance to dry delamination and to impact; and the dry mullen strength of paper board pasted with starch-urea-formaldehyde-asphalt adhesive is greater than that of paper board pasted with the same adhesive lacking the asphalt.

Although this invention has been described more particularly with reference to the starch-urea-formaldehyde resin-asphalt adhesive, which is the preferred embodiment of the invention, other glues may be substituted for starch, other resins for urea-formaldehyde and other bitumens for asphalt, and the glue component may be eliminated, as in plywood adhesives, and mineral and vegetable fillers and other materials may be present in the adhesive.

To obtain appreciable extension of the resin, at least about 20% by weight based on the resin of asphalt should be used in the adhesive composition and preferably 200% or more by weight based on resin of asphalt will be used.

We claim:

1. A fluid adhesive composition comprising an aqueous dispersion of asphalt, water-soluble synthetic resin and a water-soluble glue selected from the group consisting of water-soluble animal glues, water-soluble vegetable glues and alkali metal silicates, said glue being present in such amount that it imparts good initial tack to the composition, said resin being of such character and present in such amount that it imparts a substantial degree of waterproofness to a dried, cured film of the composition, said asphalt being present in an amount in excess of the amount of resin but less than will impair substantially the waterproofing properties imparted by the resin to a dried, cured film of the composition.

2. The composition of claim 1 wherein the resin is a thermosetting resin.

3. The composition of claim 1 wherein the resin is a urea-formaldehyde resin.

4. The composition of claim 1 wherein the glue is starch.

5. The composition of claim 1 wherein the glue is starch and the resin is a thermosetting resin.

6. The composition of claim 1 wherein the glue is starch and the resin is a urea-formaldehyde resin.

7. A fluid adhesive composition consisting of an aqueous dispersion of an asphalt, said asphalt having an ASTM D5-25 penetration of 250 to 50, a water-soluble synthetic resin and a water-soluble glue selected from the group consisting of water-soluble animal glues, water-soluble vegetable glues and alkali metal silicates, said glue being present in such amount that it imparts good initial tack to the composition, said resin being of such character and present in such amount that it imparts a substantial degree of waterproofness to a dried, cured film of the composition, said asphalt being present in an amount in excess of the amount of resin but less than will impair substantially the waterproofing properties imparted by the resin to a dried, cured film of the composition.

8. The composition of claim 7 wherein the resin is a urea-formaldehyde resin.

9. The composition of claim 7 wherein the glue is starch.

10. The composition of claim 7 wherein the glue is starch and the resin is a urea-formaldehyde resin.

11. A process of making an adhesive comprising making an aqueous glue paste, said glue being selected from the group consisting of water-soluble animal glues, water-soluble vegetable glues and alkali metal silicates, adding to the glue paste an aqueous, stable asphalt emulsion in the proportion of 0.1 to 10 parts by weight of emulsion per part by weight of paste, incorporating in the paste-emulsion mixture a water-soluble synthetic resin in an amount less than the amount of asphalt but sufficient to improve substantially the waterproofness of a dried, cured film of the adhesive.

12. The process of claim 11 wherein the glue is starch and the resin is a urea-formaldehyde resin.

13. An article of manufacture comprising a plurality of plies of felted fibrous material bonded together by means of the adhesive composition of claim 1.

14. An article of manufacture comprising a plurality of plies of felted fibrous material bonded together by means of the adhesive composition of claim 6.

15. An article of manufacture comprising a plurality of plies of felted fibrous material bonded together by means of the adhesive composition of claim 7.

16. An article of manufacture comprising a plurality of plies of felted fibrous material bonded together by means of the adhesive composition of claim 10.

LEONARD C. WOOSTER.
EARL E. GARDINER.

(References on following page)

REFERENCES CITED

The following references are of record in the file of this patent:

UNITED STATES PATENTS

| Number | Name | Date |
|---|---|---|
| 368,540 | Macdaniel | Aug. 16, 1887 |
| 1,345,081 | Ford | June 29, 1920 |
| 1,479,043 | Kirschbraun | Jan. 1, 1924 |
| 2,155,016 | Kershaw | Apr. 18, 1939 |
| 2,212,314 | Bauer | Aug. 20, 1940 |
| 2,256,886 | Buckley | Sept. 23, 1941 |
| 2,275,314 | Pierson | Mar. 3, 1942 |
| 2,314,181 | Winterkorn | Mar. 16, 1943 |
| 2,366,943 | Treadway | Jan. 9, 1945 |
| 2,399,489 | Landes | Apr. 30, 1946 |
| 2,409,258 | Davis | Oct. 15, 1946 |

FOREIGN PATENTS

| Number | Country | Date |
|---|---|---|
| 260,210 | Great Britain | May 17, 1926 |
| 337,521 | Great Britain | Nov. 6, 1930 |
| 203,436 | Switzerland | June 1, 1939 |

OTHER REFERENCES

Killinger, Paper Trade Journal, vol. 117 No. 19, Nov. 4, 1943, pp. 25–30.